United States Patent
Park

(10) Patent No.: US 7,120,152 B2
(45) Date of Patent: Oct. 10, 2006

(54) METHOD OF ROUTING A PACKET IN A ROUTING DEVICE

(75) Inventor: Sung Uk Park, Seoul (KR)

(73) Assignee: LG Electronics Inc., Seoul (KR)

( * ) Notice: Subject to any disclaimer, the term of this patent is extended or adjusted under 35 U.S.C. 154(b) by 963 days.

(21) Appl. No.: 10/026,777

(22) Filed: Dec. 27, 2001

(65) Prior Publication Data

US 2002/0085554 A1 Jul. 4, 2002

(30) Foreign Application Priority Data

Dec. 28, 2000 (KR) .............................. 2000-84709

(51) Int. Cl.
*H04L 12/28* (2006.01)
*H04L 12/66* (2006.01)
*G06F 12/00* (2006.01)

(52) U.S. Cl. ................. 370/395.32; 370/392; 370/477; 711/3

(58) Field of Classification Search ................ 370/389, 370/392, 395.31, 395.32, 477; 711/3, 119
See application file for complete search history.

(56) References Cited

U.S. PATENT DOCUMENTS

| | | | |
|---|---|---|---|
| 6,424,659 B1 * | 7/2002 | Viswanadham et al. .... | 370/469 |
| 6,570,875 B1 * | 5/2003 | Hegde ......................... | 370/389 |
| 6,614,795 B1 * | 9/2003 | Jimmei et al. ............... | 370/401 |
| 6,768,739 B1 * | 7/2004 | Kobayashi et al. .......... | 370/392 |
| 6,839,346 B1 * | 1/2005 | Kametani ..................... | 370/389 |
| 2004/0003126 A1 * | 1/2004 | Boucher et al. ............. | 709/250 |
| 2005/0047411 A1 * | 3/2005 | Kadambi et al. ............ | 370/389 |
| 2005/0089016 A1 * | 4/2005 | Zhang et al. ................ | 370/351 |

* cited by examiner

*Primary Examiner*—Doris H. To
*Assistant Examiner*—Ahmed Elallam
(74) *Attorney, Agent, or Firm*—Fleshner & Kim, LLP

(57) ABSTRACT

A method of routing a packet in a routing device having a main processor that includes a main cache table and an instant cache table is disclosed. The instant cache stores a recent address and a recent interface associated with the most recent packet transmission process made by the routing device. The method includes the steps of receiving a packet that includes its destination address, checking whether the destination address belongs to the routing device, checking whether the destination address is identical to the recent address if the destination address does not belong to the routing device, and transmitting the packet to the recent interface if the destination address is identical to the recent address. As a result, the core information related to the routing path determination is stored not only in the routing table of the protocol layer but also in the main and instant cache tables included in the main processor. Since the selection of the routing path for a given packet depends on the individual characteristic of the packet, the data processing time of the packet is greatly reduced. Consequently, the routing performance of the routing device is greatly enhanced.

18 Claims, 3 Drawing Sheets

METHOD OF ROUTING A PACKET IN A ROUTING DEVICE

This application claims the benefit of the Korean Application No. P2000-84709 filed on Dec. 28, 2000, which is hereby incorporated by reference.

BACKGROUND OF THE INVENTION

1. Field of the Invention

The present invention relates to method of routing a packet in a routing device, and more particularly, to a routing method being able to reduce the packet-processing time by setting a routing path that depends on the characteristic of each packet.

2. Discussion of the Related Art

In general, a device that connects two or more network systems having a same transmission protocol is often referred to as a routing device. A typical routing device included in a network system sets a node in the system itself or in another network system, and it transmits one or more packets received using a given transmission path.

FIG. 1 illustrates a network system including a typical routing device 10. The main processor 1 checks whether a packet is received through a port 6. When the routing device 10 receives a packet, whose destination address is set to another node or another routing device (e.g., R2), the main processor 1 sends the packet to the protocol layer 2 included in the routing device 10. The protocol layer 2 may be any one of the IP (Internet Protocol) layer 2A, IPX (Internetwork Packet exchange) layer 2B, Bridge layer 2C, and many others.

For example, when the IP layer 2A receives the packet from the main processor 1, it initially determines whether to process the packet. Once it decides to process the packet, the IP layer 2A sends the packets to the top application module 3.

On the other hand, if it decides not to process the packet, it checks the destination address of the packet. For example, the IP layer 2A obtains the interface number corresponding to the destination address of the packet by searching the IP routing table 4A of the routing table 4. And it sends the packets to the interface found. Then the packet gets transmitted to a node or routing device corresponding to the destination address of the packet.

As described above, the packet passes through a routing path that includes the main processor 1 and the IP layer 2A, and this is shown in FIG. 2. Since such routing path is formed regardless of the individual characteristic of the packet, the packet-processing rate of the routing device 10 is low. Therefore, the performance of the routing device may be degraded.

Even though it is highly desirable to provide a method of setting a routing path that depends on the individual characteristic of each packet, such method is currently unavailable for the existing routing device.

SUMMARY OF THE INVENTION

Accordingly, the present invention is directed to a method of routing a packet in a routing device that substantially obviates one or more problems due to limitations and disadvantages of the related art.

An object of the present invention is to provide a method of routing a packet in a routing device, in which a routing path depends on the characteristic of each data packet.

Another object of the present invention is to provide a method of routing a packet that optimizes the routing performance of the routing device by minimizing the data processing time of each packet.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of routing a packet in a routing device having a main processor that includes a main cache table and an instant cache table includes (a) receiving a packet that includes its destination address, (b) checking whether the destination address belongs to the routing device, (c) checking whether the destination address is identical to the recent address if the destination address does not belong to the routing device, and (d) transmitting the packet to the recent interface if the destination address is identical to the recent address.

The method further includes the steps of (e) calculating a Hashing Key value (N) of the destination address if it is determined from the step (c) that the destination address is not identical to the recent address, (f) checking whether the destination address is identical to an Nth cache address stored in the main cache table, and (g) transmitting the packet to a first interface corresponding to the Nth cache address if the destination address is identical to the Nth cache address.

Finally, the method includes the step of (h) resetting the recent address and recent interface stored in the instant cache table to the Nth cache address and the first interface, respectively.

In another aspect of the present invention, a method of routing a packet in a routing device having a main processor that includes a main cache table and an instant cache table includes the steps of (a) receiving a packet that includes its destination IP address, (b) checking whether the destination IP address belongs to the routing device, (c) checking whether the destination IP address is identical to the recent IP address if the destination IP address does not belong to the routing device, and (d) transmitting the packet to the recent IP interface if the destination IP address is identical to the recent IP address.

The method further includes the steps of (e) calculating a Hashing Key value (N) of the destination IP address if it is determined from the step (c) that the destination IP address is not identical to the recent IP address, (f) checking whether the destination IP address is identical to an Nth cache IP address stored in the main cache table, and (g) transmitting the packet to a first IP interface corresponding to the Nth cache IP address if the destination IP address is identical to the Nth cache IP address.

Finally, the method further includes the step of (h) resetting the recent IP address and recent IP interface stored in the instant cache table to the Nth cache IP address and the first IP interface, respectively.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 3:
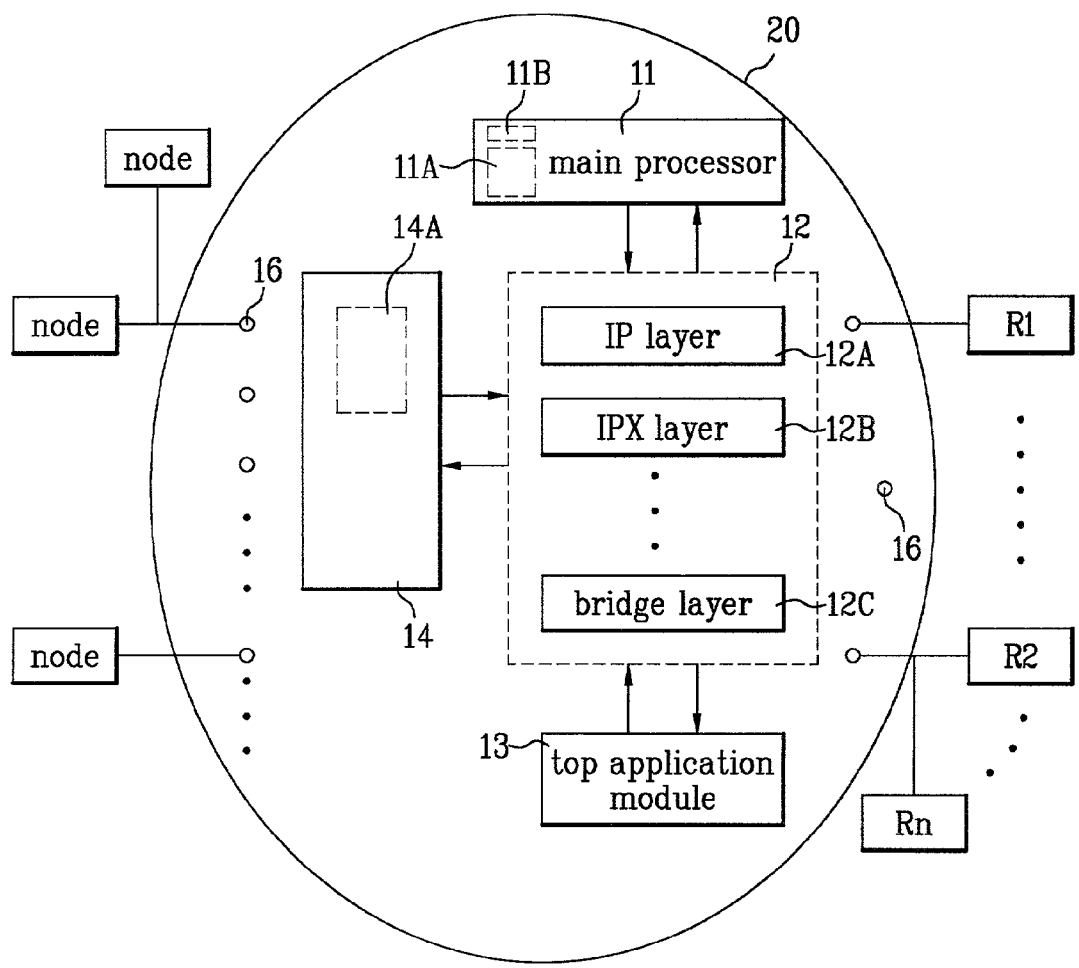
FIG. 3 illustrates a network system including a routing device of the present invention.

FIG. 3 illustrates a network system including a routing device 20 according to the present invention. As it can be seen from the figure, the device includes a main processor 11, a protocol layer 12, a top application module 13, and a routing table 14.

The protocol layer 12 may include any one of the IP (Internet Protocol) layer 12A, IPX (Internetwork Packet exchange) layer 12B, Bridge layer 12C, and many others.

The main processor 11 included in the routing device 20 of the present invention includes a main cache table 11A and an instant cache table 11B. The main cache table 11A additionally stores some of the core information stored in the routing table 14.

For example, in a case where the routing table 14 stores various information such as the destination Internet Protocol (IP) address, subset mask, gateway, metric, protocol, and interface, the main cache table 11A additionally stores the core information including the cache IP addresses and interfaces. Of course, the cache IP addresses stored in the main cache table 11A are equivalent to the destination addresses stored in the routing table 14 (e.g., IP routing table 14A).

In addition, the instant cache table 11B stores the recent address and its corresponding interface associated with the most recent packet transmission made by the routing device 20.

When the routing device 20 receives a packet from another node or routing device, the main processor 11 is able to complete its packet transmission process using both tables (11A and 11B) even without transmitting the packet to the protocol layer 12 (e.g., IP protocol layer 12A).

Figure 1:
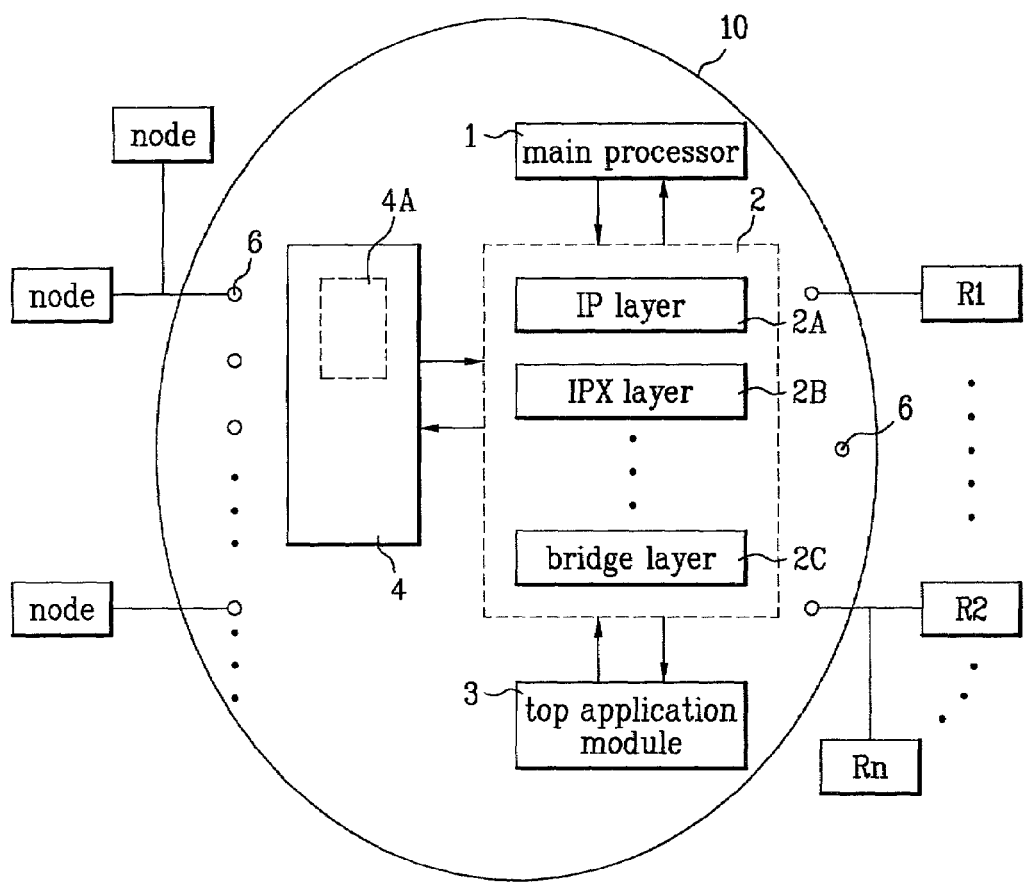
FIG. 1 illustrates a network system including a typical routing device.
Figure 2:
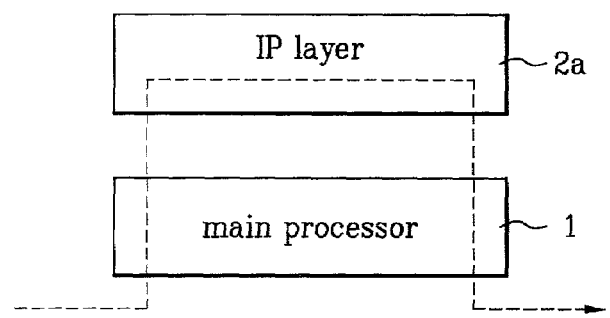
FIG. 2 illustrates a routing path that includes the main processor and the protocol IP layer of the routing device shown in FIG. 1.

In the existing routing device shown in FIG. 1, all the core information is stored in the routing table 4. Therefore, each packet must be transmitted through a routing path that includes both of the main processor 1 and the IP layer 2A.

On the other hand, in the routing device of the present invention, the core information related to the routing path determination of a packet is stored not only in the routing table 14 coupled to the protocol layer 12 but also in the main cache table 11A and instant cache table 11B included in the main processor 11.

Therefore, a routing path including the main processor 11 only or another routing path including both of the main processor 11 and the protocol layer 12 can be selected for transmitting a packet. The selection depends on the individual characteristic of the packet.

Figure 4:
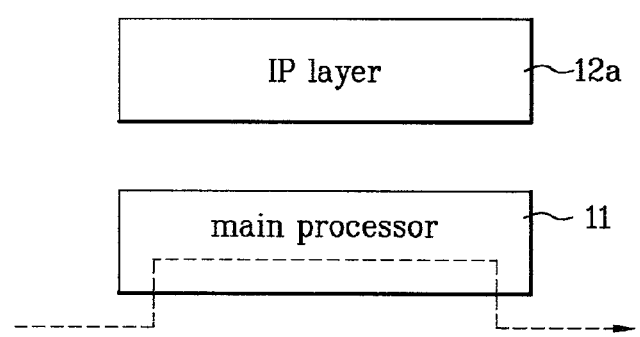
FIG. 4 illustrates a routing path that includes the main processor only in accordance with the present invention.

For example, as shown in FIG. 4, a routing path including the main processor 11 only can be used for transmitting a packet. Consequently, the required time for processing the packet will be reduced.

Figure 5:
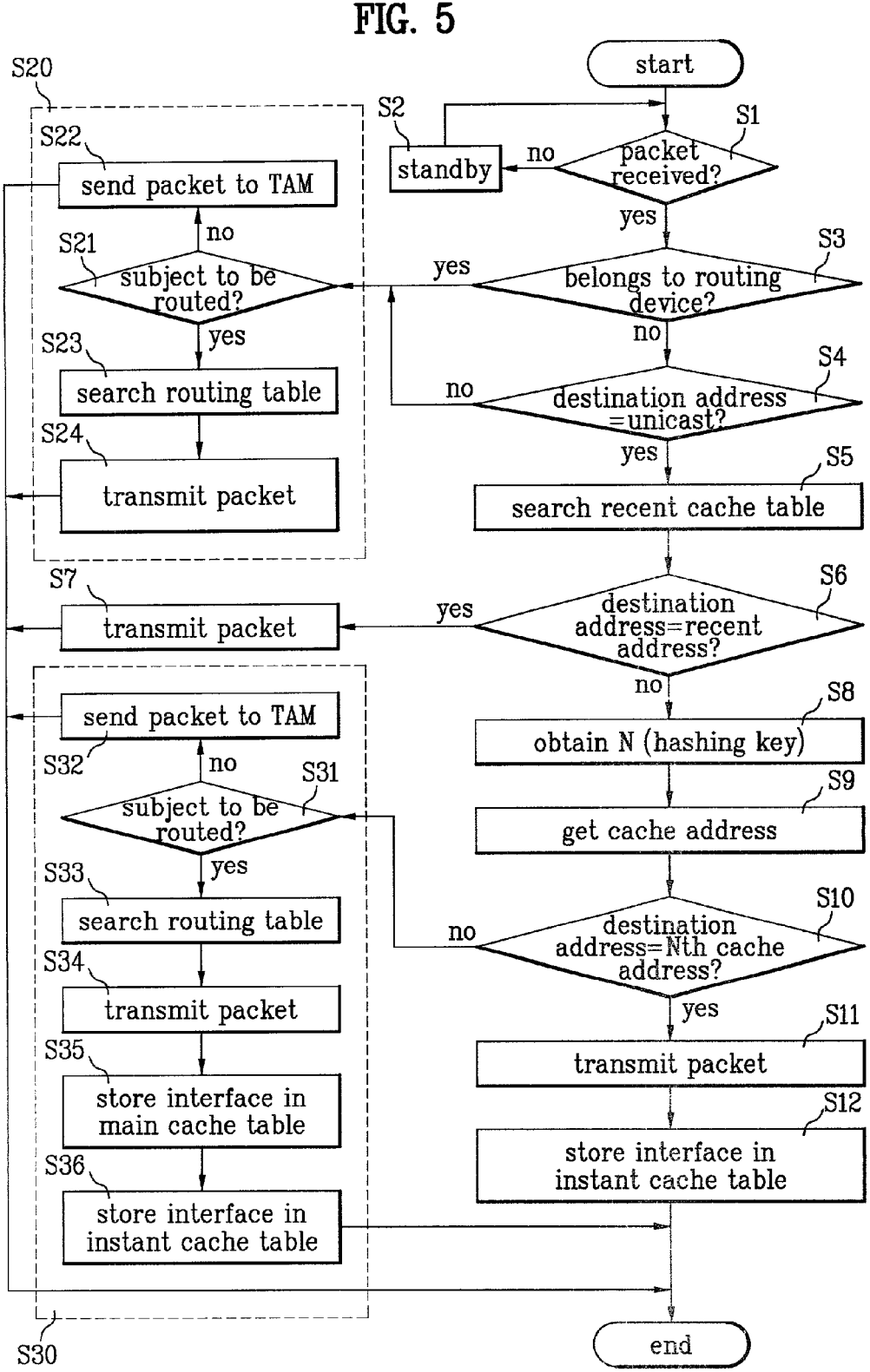
FIG. 5 illustrates a method of routing a packet in a routing device according to the present invention.

Reference will now be made in detail to a method of routing a packet in a routing device in accordance with the present invention, examples of which are illustrated in FIG. 5.

First of all, the main processor 11 of the routing device 20 periodically checks whether a packet is received for each port 16(S1). If no packet is received, it waits until a predetermined period is lapsed (S2), and repeats the step S1 again for each port.

If it is determined from the step S1 that a packet is received through a port, the main processor 11 checks whether the destination address (e.g., destination IP address) of the packet belongs to the routing device (S3). That is, the main processor 11 checks whether if the packet should be transmitted to another node or routing device. For example, the main processor 11 obtains the destination address (e.g. IP address) of the packet by searching the data region following the fourteenth byte of the IP header.

If the destination address (e.g. IP address) of the packet received belongs to the routing device 20, in which the main processor 11 is included, the main processor 11 determines that the packet should be processed in the protocol layer 12 (e.g., IP layer 12A). Therefore, it sends the packet to the protocol layer 12 (e.g., IP layer) (S20).

When the protocol layer 12 receives the packet from the main processor 11, the IP layer 12 initially determines whether the packet is subject to be processed (routing) in the protocol layer (e.g., IP layer) 12 (S21).

If it is not, the protocol layer 12 sends the packet to the top application module (TAM) 13 (S22). Otherwise, the protocol layer 12 finds the interface corresponding to the destination address of the packet by searching the routing table 14 (e.g., IP routing table 14A) (S23), and it transmits the packet to the interface found (S24).

Referring back to the step S3, if the destination address of the packet corresponds to another routing device, the main processor 11 checks whether the destination address of the packet is Unicast (S4).

If it is not (e.g., multicast, broadcast, and etc.), the main processor 11 sends the packet to the protocol layer 12 (S20). Then the protocol layer 12 repeats the steps S21 to S24.

Otherwise, the main processor 11 searches the core information stored in the instant cache table 11B (S5) and checks whether the destination address of the packet is identical to the recent address stored in the instant cache table 11B (S6). As described earlier, the recent address represents the address associated with the most recent packet transmission process made by the routing device.

If the destination address of the packet is identical to the recent address stored in the instant cache table 11B, the main processor 11 finds the interface corresponding to the recent address and sends the packet to the interface found (S7).

On the other hand, if the destination address of the packet is not identical to the recent address stored in the instant cache table 11B, the main processor 11 obtains a Hashing key corresponding to the destination address using a Hashing function (S8).

For example, the Hashing key can be obtained by [Equation 1]

$$K=(N1+N2+N3+N4)/T,$$

where K and T represent the Hashing key and the size of the main cache table 11A, and N1, N2, N3, and N4 represent the first, second, third, and fourth bytes of the destination address of the packet.

Thereafter, main processor 11 finds the cache address corresponding to the calculated Hashing key by searching the main cache table 11A (S9). For example, if the Hashing key is 4, the cache address is found in the fourth entry of the main cache table 11A. And if the Hashing key is 15, the cache address is found in the fifteenth entry of the main cache table 11A.

Next, the main processor 11 checks whether the destination address of the packet is identical to the cache address found in the step S9 (S10).

For instance, if the Hashing key turns out to be 4, then the main processor 11 checks whether the cache address that belongs to the fourth entry of the main cache table 11A is identical to the destination address of the packet.

If the destination address of the packet is not identical to the cache IP address found in the step S9, the main processor 11 concludes that the destination address does not exist in the main cache table 11A. Therefore, it sends the packet to the protocol layer 12A (S30).

When the protocol layer 12 receives the packet, the protocol layer 12 initially determines whether the packet is subject to be processed in the protocol layer 12 (S31).

If it is not, the protocol layer 12 sends the packet to the top application module (TAM) 13 (S32). Otherwise, the protocol layer 12 finds the interface corresponding to the destination address of the packet by searching the routing table 14 (e.g., IP routing table 14A) (S33), and it sends the packet to the interface found (S34).

Next, the main processor 11 stores the address and interface associated with the packet transmission process made in the step S34 in the main cache table 11A (S35). And it also stores the same information in the instant cache table 11B (S36). Accordingly, the instant cache table 11B includes the recent address and interface associated with the most recent packet transmission information.

Referring back to the step S10, if it is determined from the step S10 that the destination address of the packet is identical to the cache address found in the step S9, the main processor 11 sends the packet to the interface corresponding to the cache address (S1).

Similarly, the main processor 11 stores the interface and the cache address associated with the packet transmission process made in the step S11 in the instant cache table 11B (S12).

In conclusion, the core information related to the routing path determination is stored not only in the routing table 14 of the protocol layer 12 but also in the main and instant cache tables (11A and 11B) included in the main processor 11. Since the selection of a routing path for a given packet depends on the individual characteristic of the packet, the data processing time of the packet is reduced. Consequently, the routing performance of the routing device is enhanced.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A method of routing a packet in a routing device having a main processor that includes a main cache table and an instant cache table, said instant cache table storing a recent address and a recent interface associated with the most recent packet transmission process made by said routing device, the method comprising:
   (a) receiving a packet that includes its destination address;
   (b) checking whether said destination address belongs to said routing device;
   (c) checking whether said destination address is identical to said recent address if said destination address does not belong to said routing device;
   (d) transmitting said packet to said recent interface if said destination address is identical to said recent address;
   (e) calculating a Hashing Key value (N) of said destination address if it is determined from the (c) checking that said destination address is not identical to said recent address;
   (f) checking whether said destination address is identical to an Nth cache address stored in said main cache table; and
   (g) transmitting said packet to a first interface corresponding to said Nth cache address if said destination address is identical to said Nth cache address.

2. The method of claim 1, further comprising (h) resetting said recent address and recent interface stored in said instant cache table to said Nth cache address and said first interface, respectively.

3. The method of claim 1, further comprising sending said packet to a protocol layer included in said routing device if it is determined from the (b) checking that said destination address belongs to said routing device, said protocol layer being coupled to a routing table.

4. The method of claim 3, further comprising sending said packet to a top application module included in said routing device.

5. The method of claim 3, wherein a first interface corresponding to said destination address is found by searching said routing table.

6. The method of claim 1, further comprising sending said packet to a protocol layer included in said routing device if it is determined from the (f) checking that said destination address is not identical to said Nth cache address, said protocol layer being coupled to a routing table.

7. The method of claim 6, further comprising sending said packet to a top application module included in said routing device.

8. The method of claim 6, further comprising transmitting said packet to a second interface corresponding to said destination address.

9. The method of claim 8, wherein said second interface corresponding to said destination address is found by searching said routing table.

10. The method of claim 8, further comprising:
    storing said destination address and said second interface in said main cache table; and
    resetting said recent address and recent interface stored in said instant cache table to said destination address and said second interface.

11. The method of claim 1, wherein said Hashing Key value is determined by $$K=(N1+N2+N3+N4)/T,$$

where

K represents said Hashing Key value,

T represents the size of said main cache table, and

N1 to N4 represent the first, second, third, and fourth byte data of said destination address, respectively.

12. A method of routing a packet in a routing device having a main processor that includes a main cache table and an instant cache table, said instant cache table storing a recent IP address and a recent IP interface associated with the most recent packet transmission process made by said routing device, the method comprising:
 (a) receiving a packet that includes its destination IP address;
 (b) checking whether said destination IP address belongs to said routing device;
 (c) checking whether said destination IP address is identical to said recent IP address if said destination IP address does not belong to said routing device;
 (d) transmitting said packet to said recent IP interface if said destination IP address is identical to said recent IP address;
 (e) calculating a Hashing Key value (N) of said destination IP address if it is determined from the (c) checking that said destination IP address is not identical to said recent IP address;
 (f) checking whether said destination IP address is identical to an Nth cache IP address stored in said main cache table; and
 (g) transmitting said packet to a first IP interface corresponding to said Nth cache IP address if said destination IP address is identical to said Nth cache IP address.

13. The method of claim 12, further comprising (h) resetting said recent IP address and recent IP interface stored in said instant cache table to said Nth cache IP address and said first IP interface, respectively.

14. The method of claim 12, further comprising sending said packet to an IP layer included in said routing device if it is determined from the (b) checking that said destination IP address belongs to said routing device, said IP layer being coupled to an IP routing table.

15. The method of claim 14, further comprising transmitting said packet to first IP interface corresponding to said destination IP address, said first IP interface being found by searching said IP routing table.

16. The method of claim 12, further comprising sending said packet to an IP layer included in said routing device if it is determined from the (f) checking that said destination IP address is not identical to said Nth cache IP address, said IP layer being coupled to an IP routing table.

17. The method of claim 16, further comprising transmitting said packet to a second IP interface corresponding to said destination IP address, said second IP interface being found by searching said IP routing table.

18. The method of claim 17, further comprising:
 storing said destination IP address and said second IP interface in said main cache table; and
 resetting said recent IP address and recent IP interface stored in said instant cache table to said destination IP address and said second IP interface.

* * * * *